United States Patent
Bascour et al.

(10) Patent No.: US 12,136,744 B2
(45) Date of Patent: Nov. 5, 2024

(54) HYBRID FLUOROPOLYMER ELECTROLYTE MEMBRANE

(71) Applicant: SYENSQO SA, Brussels (BE)

(72) Inventors: Dominique Bascour, Grez-Doiceau (BE); Guillaume Müller, Woluwe-Saint-Pierre (BE); Menouar Mazouzi, Brussels (BE)

(73) Assignee: SYENSQO SA, Brussels (BE)

( * ) Notice: Subject to any disclaimer, the term of this patent is extended or adjusted under 35 U.S.C. 154(b) by 470 days.

(21) Appl. No.: 17/637,471

(22) PCT Filed: Jul. 28, 2020

(86) PCT No.: PCT/EP2020/071265
§ 371 (c)(1),
(2) Date: Feb. 23, 2022

(87) PCT Pub. No.: WO2021/052663
PCT Pub. Date: Mar. 25, 2021

(65) Prior Publication Data
US 2022/0278422 A1    Sep. 1, 2022

(30) Foreign Application Priority Data

Sep. 16, 2019 (EP) .................................. 19197491

(51) Int. Cl.
*H01M 50/00* (2021.01)
*H01M 10/052* (2010.01)
*H01M 50/403* (2021.01)
*H01M 50/446* (2021.01)

(52) U.S. Cl.
CPC ....... *H01M 50/446* (2021.01); *H01M 10/052* (2013.01); *H01M 50/403* (2021.01)

(58) Field of Classification Search
CPC ............ H01M 50/446; H01M 10/052; H01M 50/403; H01M 10/0525; H01M 10/0565; H01G 11/56; H01G 11/06; C08J 5/22
See application file for complete search history.

(56) References Cited

U.S. PATENT DOCUMENTS

| | | | |
|---|---|---|---|
| 2017/0073483 A1 | 3/2017 | Ducros et al. | |
| 2019/0190058 A1 | 6/2019 | Hamon et al. | |
| 2019/0252657 A1* | 8/2019 | Abusleme | C08F 20/06 |

FOREIGN PATENT DOCUMENTS

| | | |
|---|---|---|
| WO | 11121078 A1 | 10/2011 |
| WO | 13160240 A1 | 10/2013 |
| WO | 15169834 A1 | 11/2015 |
| WO | 2017/140649 A1 | 8/2017 |
| WO | 17216184 A1 | 12/2017 |
| WO | 2019/115500 A1 | 6/2019 |

OTHER PUBLICATIONS

Directive 94/9/EC of the European Parliament and the Council of Mar. 23, 1994 on the approximation of the laws of the Member States concerning equipment and protective systems intended for use in potentially explosive atmospheres, Apr. 19, 1994, Official Journal of the European Communities.

* cited by examiner

*Primary Examiner* — Anca Eoff
*Assistant Examiner* — Monique M Wills
(74) *Attorney, Agent, or Firm* — Osha Bergman Watanabe & Burton LLP

(57) ABSTRACT

The present invention pertains to a process for manufacturing a fluoropolymer electrolyte membrane comprising a fluoropolymer hybrid organic/inorganic composite for an electrochemical cell, to a polymer electrolyte membrane obtainable by the process and films and membranes thereof and to an electrochemical cell comprising the polymer electrolyte membrane between a positive electrode and a negative electrode. The present invention also relates to the use of the polymer electrolyte membrane obtainable by the process according to the present invention in an electrochemical device, in particular in secondary batteries.

14 Claims, No Drawings

HYBRID FLUOROPOLYMER ELECTROLYTE MEMBRANE

CROSS-REFERENCE TO RELATED APPLICATION

This application is a U.S. national stage entry under 35 U.S.C. § 371 of International Application No. PCT/EP2020/071265 filed Jul. 28, 2020, which claims priority to European patent application No. 19197491.4, filed on Sep. 16, 2019. The entire contents of these applications are explicitly incorporated herein by this reference.

TECHNICAL FIELD

The present invention relates to a process for manufacturing a fluoropolymer electrolyte membrane comprising a fluoropolymer hybrid organic/inorganic composite for an electrochemical cell, to a polymer electrolyte membrane obtainable by the process and to an electrochemical cell comprising the polymer electrolyte membrane between a positive electrode and a negative electrode. The present invention also relates to the use of the polymer electrolyte membrane obtainable by the process according to the present invention in an electrochemical device, in particular in secondary batteries.

BACKGROUND OF THE INVENTION

Hybrid organic/inorganic polymer composites where inorganic materials on a nano-scale or molecular level are dispersed in organic polymers have raised a great deal of scientific, technological and also industrial interests, because of the unique properties they have.

Hybridization of organic and inorganic compounds is an evolutionary manner to create a polymeric structure, notably to increase mechanical properties. In this regards, it is well known that a sol-gel process using metal alkoxides is the most useful and important approach, in elaborating hybrid organic/inorganic polymer composites. In particular, the hydrolysis and condensation of metal alkoxides in the presence of pre-formed organic polymers can be properly controlled to obtain hybrid organic/inorganic polymer composites with improved properties in comparison with the original organic and inorganic compounds. The polymer as organic compound may enhance the toughness and processability of inorganic materials, i.e., metal alkoxides, which are brittle in general, wherein the inorganic network may enhance scratch resistance, mechanical properties and surface characteristics of the resulting hybrid organic/inorganic polymer composite.

Hybrids made from sol-gel technique starting from fluoropolymers, in particular from vinylidene fluoride polymers are known in the art.

For instance, WO 2011/121078 discloses a process for the manufacture of fluoropolymer hybrid organic/inorganic composites wherein at least a fraction of hydroxyl groups of a fluoropolymer are reacted in a solution or in a molten state with at least a fraction of hydrolysable groups of a metal compound of formula $X_{4-m}AY_m$, wherein X is a hydrocarbon group, Y is a hydrolysable group, A is a metal selected from Si, Ti and Zr, and m is an integer from 1 to 4. The selection of the solvent used to dissolve a fluoropolymer was not critical, provided that it may efficiently solvates both fluoropolymer and metal compound of formula $X_{4-m}AY_m$ and does not interfere with the reaction between the hydroxyl group of the fluoropolymer and the hydrolysable groups of the metal compound. However, the solvent needs to be evaporated by drying to produce a membrane. This patent document also mentions that swelling of an electrolyte solution comprising a mixture of ethylene carbonate and propylene carbonate, and $LiPF_6$ occurs in the film made of the said hybrid organic/inorganic composites. Moreover, once the film being cast, swelling may continue so that the final amount of liquid electrolyte eventually interpenetrated into the film would become less so that the ionic conductivity would decrease accordingly.

Facing such drawbacks, WO 2013/160240 discloses the manufacture of the fluoropolymer hybrid organic/inorganic composite in the presence of a liquid medium, to provide a self-standing fluoropolymer film stably comprising and retaining said liquid medium, while having outstanding ionic conductivity. When the hybrid organic/inorganic composite is for use as polymer electrolyte separator in electrochemical devices, it may be obtained by a process comprising hydrolysis and/or polycondensation of a mixture comprising a fluoropolymer, a metal compound of formula $X_{4-m}AY_m$, an ionic liquid, a solvent, and one electrolytic salt. The resulting liquid mixture is then processed into a film by casting.

However, the process according to WO 2013/160240 requires the use of processing solvents like acetone, N-methyl-2-pyrrolidone (NMP), N,N-dimethylformamide (DMF), N,N-dimethylacetamide (DMA) and similar, all of which need to be evaporated by drying/heating at the end of the processing to produce a membrane and are hence undesirable in an industrial production processes.

WO 2015/169834 also describes a process to manufacture a fluoropolymer hybrid organic/inorganic composite endowed with outstanding crosslinking density properties, good ionic conductivity properties, and increased electrolyte retention within the polymer electrolyte membrane. However, this process also requires the processing solvent to prepare a polymer solution, which hence necessitates an evaporation step of the processing solvent so as to obtain a membrane.

In addition to the inconvenience in having an additional step to remove the processing solvent used in the process and the shortcoming in view of processability and industrialization, such processing solvents, notably acetone, are under the ATEX Directive 94/9/EC, adopted by the European Union (EU) in 1994. ATEX Directive establishes technical and legal requirements for products intended for use inside hazardous areas with potentially explosive atmospheres. ATEX Directive derives its name from the French title of the 94/9/EC Directive, i.e., "(Appareils destinés à être utilisés en) Atmosphères Explosibles". As of July 2003, it is mandatory to use products which have an ATEX type approval within EU so that any product placed on the market or put into use in hazardous environments regulated by the ATEX Directive is required to meet the standards stipulated therein. The standards vary depending on the classification of the hazardous areas. Accordingly, certain solvents comprising acetone, which are considered to be able to generate explosive atmosphere, are often of concern for the manufacturers in battery field.

Accordingly, the quest for a process to produce a fluoropolymer hybrid organic/inorganic composite without using a processing solvent, exists in this field.

To answer this demand from the field, several solutions have been considered. One is to find an alternative solvent with better ATEX properties without losing any solubility feature, grafting ratio and other parameters which may affect the formation of membrane. Another approach is to find an alternative process which does not require any processing solvent in making a polymer solution.

SUMMARY OF THE INVENTION

The present invention thus provides a process for manufacturing a fluoropolymer electrolyte membrane comprising a fluoropolymer hybrid organic/inorganic composite for an electrochemical device, said process comprising the steps of:
a) dissolving i) at least one fluoropolymer in ii) at least one liquid medium, wherein the i) at least one fluoropolymer comprises
   at least one first recurring unit derived from at least one ethylenically unsaturated fluorinated monomer and
   at least one second recurring unit derived from at least one ethylenically unsaturated monomer having at least one hydroxyl group;
b) reacting at least a fraction of the hydroxyl groups of the i) at least one fluoropolymer with iii) at least one metal compound of formula (I)

$$X_{4-m}AY_m \quad (I)$$

wherein m is an integer from 1 to 3, A is a metal selected from the group consisting of Si, Ti and Zr, Y is a hydrolysable group and X is a hydrocarbon group comprising at least one isocyanate (—N═C═O) functional group, thereby providing a composition comprising at least one grafted fluoropolymer comprising at least one hydrogenated monomer having at least one pendant side chain comprising an end group of formula —O—C(O)—NH—Z—AY$_m$X$_{3-m}$ wherein m, Y, A and X have the same meaning as defined above and Z is a hydrocarbon group, optionally comprising at least one —N═C═O functional group;
c) reacting the end group of formula —O—C(O)—NH—Z—AY$_m$X$_{3-m}$ with iv) at least one metal compound of formula (II)

$$X'_{4-m'}A'Y'_{m'} \quad (II)$$

wherein m' is in integer from 1 to 4, A' is a metal selected from the group consisting of Si, Ti and Zr, Y' is a hydrolysable group, optionally comprising at least one functional group different from the —N═C═O group, and X' is a hydrocarbon group, thereby providing a composition comprising at least one fluoropolymer hybrid organic/inorganic composite; and
d) processing the composition from step c) into a polymer electrolyte membrane,
characterized by the absence of a drying step.

A second object of the present invention is a polymer electrolyte membrane which can be obtained as above defined.

A third object of the present invention is an electrochemical device comprising the polymer electrolyte membrane as above defined between a positive electrode and a negative electrode.

A further object of the present invention is the use of the polymer electrolyte membrane as above defined in an electrochemical device, in particular in secondary batteries.

The Applicant has now surprisingly found that it is possible to manufacture a fluoropolymer electrolyte membrane comprising a fluoropolymer hybrid organic/inorganic composite without using a processing solvent to dissolve a fluoropolymer, with further advantage of avoiding the subsequent recovery and disposal of said solvent.

In particular, the Applicant has found that a liquid medium comprising at least one organic solvent can replace the processing solvent so as to dissolve a fluoropolymer. Accordingly, the drying step to evaporate the processing solvent is not required to produce a fluoropolymer electrolyte membrane and moreover the several concerns in view of ATEX regulation disappeared.

The fluoropolymer electrolyte membrane according to the present invention is characterized in that it's free from a metal salt, for instance Lithium salt. As disclosed in WO 2017/216184, such a feature can be complemented by using the migration feature of a metal salt from any of a positive electrode and a negative electrode towards the electrolyte membrane within an electrochemical device so that good electrochemical performance can be assured.

DETAILED DESCRIPTION OF THE INVENTION

Throughout this specification, unless the context requires otherwise, the word "comprise" or "include", or variations such as "comprises", "comprising", "includes", "including" will be understood to imply the inclusion of a stated element or method step or group of elements or method steps, but not the exclusion of any other element or method step or group of elements or method steps. According to preferred embodiments, the word "comprise" and "include", and their variations mean "consist exclusively of".

As used in this specification, the singular forms "a", "an" and "the" include plural aspects unless the context clearly dictates otherwise. The term "and/or" includes the meanings "and", "or" and also all the other possible combinations of the elements connected to this term.

The term "between" should be understood as being inclusive of the limits.

As used herein, "alkyl" groups include saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups.

The term "aliphatic group" includes organic moieties characterized by straight or branched-chains, typically having between 1 and 18 carbon atoms. In complex structures, the chains may be branched, bridged, or cross-linked. Aliphatic groups include alkyl groups, alkenyl groups, and alkynyl groups.

As used herein, the terminology "(Cn-Cm)" in reference to an organic group, wherein n and m are integers, respectively, indicates that the group may contain from n carbon atoms to m carbon atoms per group.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 120° C. to about 150° C. should be interpreted to include not only the explicitly recited limits of about 120° C. to about 150° C., but also to include sub-ranges, such as 125° C. to 145° C., 130° C. to 150° C., and so forth, as well as individual amounts, including fractional amounts, within the specified ranges, such as 122.2° C., 140.6° C., and 141.3° C., for example.

The constituents of the process for manufacturing a fluoropolymer electrolyte membrane comprising a fluoropolymer hybrid organic/inorganic composite for an electrochemical device according to the present invention are described hereinafter in details. It is to be understood that both the foregoing general description and the following detailed description are exemplary and are intended to provide further explanation of the invention as claimed. Accordingly, various changes and modifications described herein will be apparent to those skilled in the art. Moreover, descriptions of well-known functions and constructions may be omitted for clarity and conciseness.

A first object of the present invention is a process for manufacturing a fluoropolymer electrolyte membrane comprising a fluoropolymer hybrid organic/inorganic composite for an electrochemical device, said process comprising the steps of:
  a) dissolving i) at least one fluoropolymer in ii) at least one liquid medium, wherein the i) at least one fluoropolymer comprises
     at least one first recurring unit derived from at least one ethylenically unsaturated fluorinated monomer and
     at least one second recurring unit derived from at least one ethylenically unsaturated monomer having at least one hydroxyl group;
  b) reacting at least a fraction of the hydroxyl groups of the i) at least one fluoropolymer with iii) at least one metal compound of formula (I)

wherein m is an integer from 1 to 3, A is a metal selected from the group consisting of Si, Ti and Zr, Y is a hydrolysable group and X is a hydrocarbon group comprising at least one isocyanate (—N=C=O) functional group, thereby providing a composition comprising at least one grafted fluoropolymer comprising at least one hydrogenated monomer having at least one pendant side chain comprising an end group of formula —O—C(O)—NH—Z—AY$_m$X$_{3-m}$, wherein m, Y, A and X have the same meaning as defined above and Z is a hydrocarbon group, optionally comprising at least one —N=C=O functional group;
  c) reacting the end group of formula —O—C(O)—NH—Z—AY$_m$X$_{3-m}$ with iv) at least one metal compound of formula (II)

wherein m' is in integer from 1 to 4, A' is a metal selected from the group consisting of Si, Ti and Zr, Y' is a hydrolysable group, optionally comprising at least one functional group different from the —N=C=O group, and X' is a hydrocarbon group, thereby providing a composition comprising at least one fluoropolymer hybrid organic/inorganic composite; and
  d) processing the composition from step c) into a polymer electrolyte membrane,
  characterized by the absence of a drying step.

The fluoropolymer electrolyte membrane according to the present invention is advantageously free from one or more metal salt including, but not limited to, one ore metal salts selected from the group consisting of:
  MeI, Me(PF$_6$)$_n$, Me(BF$_4$)$_n$, Me(ClO$_4$)$_n$, Me(bis(oxalato) borate)$_n$ ("Me(BOB)$_n$"), MeCF$_3$SO$_3$, Me[N(CF$_3$SO$_2$)$_2$]$_n$, Me[N(C$_2$F$_5$SO$_2$)$_2$]$_n$, Me[N(CF$_3$SO$_2$)(R$_F$SO$_2$)]$_n$, wherein R$_F$ is C$_2$F$_5$, C$_4$F$_9$ or CF$_3$OCF$_2$CF$_2$, Me(AsF$_6$)$_n$, Me[C(CF$_3$SO$_2$)$_3$]$_n$, or Me$_2$S$_n$,
wherein Me is a metal, preferably a transition metal, an alkaline metal or an alkaline-earth metal, more preferably Li, Na, K or Cs, even more preferably Li, and n is the valence of said metal, typically n being 1 or 2;

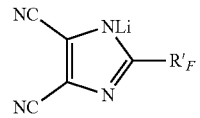

wherein R'$_F$ is selected from the group consisting of F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_3$F$_5$OCF$_3$, C$_2$F$_4$OCF$_3$, C$_2$H$_2$F$_2$OCF$_3$ and CF$_2$OCF$_3$; and
combinations thereof In one embodiment, step c) is carried out at room temperature or upon heating at temperature lower than 100° C.

In a preferred embodiment, the step c) is implemented at temperature between 50° C. and 100° C., and preferably between 70° C. and 90° C.

In step c), the iv) at least one metal compound of formula (II) as above defined is hydrolyzed and/or polycondensed with the end group of formula —O—C(O)—NH—Z—AY$_m$X$_{3-m}$ from the step b).

In a preferred embodiment, the hydrolysis and/or polycondensation in step c) as above defined is initiated by addition of at least an acid catalyst. The choice of the acid catalyst is not particularly limited. The acid catalyst is typically selected from the group consisting of organic acid and inorganic acids. The acid catalyst is preferably selected from the group consisting of organic acids, for instance, citric acid and formic acid. In a preferred embodiment, the acid catalyst is formic acid.

In the present invention, the term "membrane" is intended to denote a discrete and generally thin interface which moderates permeation of chemical species in contact with it. This interface may be homogeneous, i.e., completely uniform in structure (dense membrane), or it may be chemically or physically heterogeneous, for examples containing voids, pores or holes of finite dimensions (porous membrane).

In the present invention, the term "fluoropolymer" is intended to denote a (co)polymer, wherein at least one hydrogen atom is replaced by fluorine. One, two, three or a higher number of hydrogen atoms may be replaced by fluorine.

Polyvinylidenefluoride (PVDF or VDF polymer) is one of the most widely used fluoropolymers in battery components, due to its high anodic stability and high dielectric constant, which favours the ionisation of lithium salts in lithium-ion batteries and enables the flow of ions, resulting in the improvement of the cell performance.

According to one embodiment, the first recurring unit derived from at least one ethylenically unsaturated fluorinated monomer is vinylidene fluoride (VDF), chlorotrifluoroethylene (CTFE), hexafluoropropylene (HFP), tetrafluoroethylene (TFE), trifluoroethylene, and combinations thereof.

In one embodiment, the fluoropolymer of the present invention comprises two first recurring units derived from at least one ethylenically unsaturated fluorinated monomer. In a specific embodiment, said two first recurring units are VDF and CTFE. In another specific embodiment, said two first recurring units are VDF and TFE. In a preferred embodiment, said two first recurring units are VDF and HFP.

In one embodiment, the first recurring unit according to the present invention is VDF (co)polymer.

In the present invention, the VDF polymer refers to a polymer essentially made of the recurring units, more than 85% by moles of said recurring units being derived from VDF.

The VDF polymer is preferably a polymer comprising
(a) at least 85% by moles of the recurring units derived from VDF;
(b) optionally from 0.1 to 15%, preferably from 0.1 to 12%, more preferably from 0.1 to 10% by moles of the recurring units derived from a fluorinated monomer different from VDF; and
(c) optionally from 0.1 to 5%, by moles, preferably 0.1 to 3% by moles, more preferably 0.1 to 1% by moles of the recurring units derived from one or more hydrogenated comonomers,
wherein all the aforementioned % by moles is referred to the total moles of recurring units of the VDF polymer.

Non-limiting examples of suitable fluorinated monomer as i) the first recurring unit, different from VDF, include, notably, the followings:

$C_2$-$C_8$ perfluoroolefins, such as tetrafluoroethylene and hexafluoropropylene (HFP);

$C_2$-$C_8$ hydrogenated fluoroolefins, such as vinyl fluoride, 1,2-difluoroethylene and trifluoroethylene;

perfluoroalkylethylenes of formula $CH_2=CH-R_{f0}$, wherein $R_{f0}$ is a $C_1$-$C_6$ perfluoroalkyl;

chloro- and/or bromo- and/or iodo-$C_2$-$C_6$ fluoroolefins, such as chlorotrifluoroethylene;

(per)fluoroalkylvinylethers of formula $CF_2=CFOR_{f1}$, wherein $R_{f1}$ is a $C_1$-$C_6$ fluoro- or perfluoroalkyl, such as $CF_3$, $C_2F_5$, $C_3F_7$;

$CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;

(per)fluoroalkylvinylethers of formula $CF_2=CFOCF_2OR_{f2}$, wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as $-C_2F_5-O-CF_3$;

functional (per)fluoro-oxyalkylvinylethers of formula $CF_2=CFOY_0$, wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form; and fluorodioxoles, preferably perfluorodioxoles.

In a preferred embodiment, said fluorinated monomer as the first recurring unit is advantageously selected from the group consisting of vinyl fluoride, trifluoroethylene, chlorotrifluoroethylene (CTFE), 1,2-difluoroethylene, tetrafluoroethylene (TFE), hexafluoropropylene (HFP), perfluoro (alkyl)vinyl ethers, such as perfluoro(methyl)vinyl ether (PMVE), perfluoro(ethyl) vinyl ether (PEVE) and perfluoro (propyl)vinyl ether (PPVE), perfluoro(1,3-dioxole), perfluoro(2,2-dimethyl-1,3-dioxole) (PDD). Preferably, the possible additional fluorinated monomer is selected from the group consisting of chlorotrifluoroethylene (CTFE), hexafluoroproylene (HFP), trifluoroethylene (TrFE) and tetrafluoroethylene (TFE).

In a more preferred embodiment, the fluorinated monomer is hexafluoropropylene (HFP).

In another embodiment, as non-limitative examples of the VDF (co)polymers as the first recurring unit of the fluoropolymer in the present invention, mention can be notably made of homopolymers of VDF, VDF/TFE copolymers, VDF/TFE/HFP copolymers, VDF/TFE/CTFE copolymers, VDF/TFE/TrFE copolymers, VDF/CTFE copolymers, VDF/HFP copolymers, VDF/TFE/HFP/CTFE copolymers, and the like. In particular, VDF/HFP copolymers have been attracting considerable attention due to its good compatibility with the electrodes, its low transition temperature and crystallinity, which enable to improve the ionic conductivity.

Said hydrogenated comonomer is not particularly limited; α-olefins, (meth)acrylic monomers, vinyl ether monomers, and styrenic monomers may be used.

Accordingly, the VDF polymer is more preferably a polymer consisting essentially of:
(a) at least 85% by moles of recurring units derived from VDF;
(b) optionally from 0.1 to 15%, preferably from 0.1 to 12%, more preferably from 0.1 to 10% by moles of a fluorinated monomer different from VDF; said fluorinated monomer being preferably selected in the group consisting of vinylfluoride, chlorotrifluoroethylene (CTFE), hexafluoropropene (HFP), tetrafluoroethylene (TFE), perfluoromethylvinylether (MVE), trifluoroethylene (TrFE) and mixtures therefrom,
wherein all the aforementioned % by moles is referred to the total moles of recurring units of the VDF polymer.

Defects, end chains, impurities, chain inversions or branchings and the like may be additionally present in the VDF polymer in addition to the said recurring units, without these components substantially modifying the behaviour and properties of the VDF polymer.

According to one embodiment, the second recurring unit is derived from an (meth)acrylic acid ester having a hydroxyl group.

According to one embodiment, the (meth)acrylic acid ester having a hydroxyl group comprises 2-hydroxyethyl acrylate (HEA), 2-hydroxyethyl methacrylate, 2-hydroxymethyl acrylate, 2-hydroxymethyl methacrylate, 2-hydroxypropyl acrylate, 2-hydroxypropyl methacrylate, 2-hydroxybutyl acrylate, 2-hydroxybutyl methacrylate, 4-hydroxybutyl acrylate, 4-hydroxybutyl methacrylate, 6-hydroxyhexyl acrylate, 6-hydroxyhexyl methacrylate, 8-hydroxyoctyl acrylate, 8-hydroxyoctyl methacrylate, 2-hydroxyethyleneglycol acrylate, 2-hydroxyethlyeneglycol methacrylate, 2-hydroxypropyleneglycol acrylate, 2-hydroxypropyleneglycol methacrylate, 2,2,2-trifluoroethyl acrylate, and 2,2,2-trifluoroethyl methacrylate.

In a preferred embodiment, the second recurring unit is HEA.

In one embodiment, the fluorinated copolymer comprises from 0.1 to 20.0% by moles, preferably from 0.1 to 15.0% by moles, more preferably from 0.1 to 10.0% by moles of the second recurring unit derived from at least one ethylenically unsaturated monomer having a hydroxyl group.

In a preferred embodiment, the fluorinated copolymer comprises:
from 90.0 to 99.9% by moles of the first recurring unit derived from at least one ethylenically unsaturated fluorinated monomer
from 0.1 to 10.0% by moles of the second recurring unit derived from at least one ethylenically unsaturated monomer having a hydroxyl group.

In a more preferred embodiment, the fluorinated copolymer comprises:

from 80.0 to 99.8% by moles of VDF and from 0.1 to 10.0% by moles of RFP as the first recurring units derived from at least one ethylenically unsaturated fluorinated monomer; and from 0.1 to 10.0% by moles of HEA as the second recurring unit derived from at least one ethylenically unsaturated monomer having a hydroxyl group.

Liquid Medium

In the present invention, the term "liquid medium" is intended to denote a composition comprising one or more substances in the liquid state at 20° C. under atmospheric pressure.

The liquid medium typically comprises at least one organic solvent and optionally at least one ionic liquid.

The choice of the organic solvent is not particularly limited provided that it is suitable for solubilizing the fluoropolymer according to the present invention and does not fall within the explosive atmosphere as stipulated in the ATEX Directive 94/9/EC, where the explosive atmosphere is defined as a mixture i) of flammable substances in the form of gases, vapours, mists or dusts; ii) with air; iii) under atmospheric conditions; and iv) in which, after ignition, the combustion spreads to the entire unburned mixture.

Non-limitative examples of suitable organic solvents include, notably, the followings:
  aliphatic, cycloaliphatic or aromatic ether oxides, more particularly, dibutyl oxide, dipentyl oxide, diisopentyl oxide, ethylene glycol dimethyl ether, ethylene glycol diethyl ether, ethylene glycol dibutyl ether benzyl oxide;
  glycol ethers, such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether;
  glycol ether esters, such as ethylene glycol methyl ether acetate, ethylene glycol monoethyl ether acetate, ethylene glycol monobutyl ether acetate;
  alcohols, such as diacetone alcohol;
  ketones, such as methylisobutyl ketone, diisobutylketone, cyclohexanone, isophorone; and
  linear or cyclic esters, such as n-butyl acetate, methyl acetoacetate, dimethyl phthalate, γ-butyrolactone;
  linear or cyclic amides, such as N,N-diethylacetamide, N,N-dimethylacetamide, N,N-dimethylformamide and N-methyl-2-pyrrolidone; and
  dimethyl sulfoxide.

In one embodiment, the organic solvent comprises at least one organic carbonate compound.

In the present invention, the organic carbonate compound may be partially or fully fluorinated carbonate compound. The organic carbonate compound according to the present invention may be either cyclic carbonate or acyclic carbonate.

Non-limiting examples of the organic carbonate compound include, notably, ethylene carbonate (1,3-dioxolan-2-one), propylene carbonate, 4-methylene-1,3-dioxolan-2-one, 4,5-dimethylene-1,3-dioxolan-2-one, dimethyl carbonate, diethyl carbonate, ethyl methyl carbonate, dipropyl carbonate, methyl propyl carbonate, methyl butyl carbonate, ethyl butyl carbonate, propyl butyl carbonate, dibutyl carbonate, di-tert-butyl carbonate and butylene carbonate.

The fluorinated carbonate compound may be mono-fluorinated or polyfluorinated. Suitable examples of the fluorinated carbonate compound comprises, but not limited to, mono-fluorinated ethylene carbonate (4-fluoro-1,3-dioxolan-2-one) and difluorinated ethylene carbonate, mono- and difluorinated propylene carbonate, mono- and difluorinated butylene carbonate, 3,3,3-trifluoropropylene carbonate, fluorinated dimethyl carbonate, fluorinated diethyl carbonate, fluorinated ethyl methyl carbonate, fluorinated dipropyl carbonate, fluorinated dibutyl carbonate, fluorinated methyl propyl carbonate, and fluorinated ethyl propyl carbonate.

In a preferred embodiment, the organic carbonate compound is a mixture of ethylene carbonate and propylene carbonate.

In another preferred embodiment, the organic carbonate compound is a mixture of ethylene carbonate, propylene carbonate and 4-fluoro-1,3-dioxolan-2-one.

In another embodiment, the organic solvent comprises at least one organic carbonate compound and at least one sulfone compound. The sulfone compound according to the present invention may be either cyclic sulfone or acyclic sulfone.

Non-limiting examples of the sulfone compound include, notably, tetramethylene sulfone (sulfolane), butadiene sulfone (sulfolene), pentamethylene sulfone, hexamethylene sulfone, thiazolidine 1,1-dioxide, thiomorpholine 1,1-dioxide, dimethyl sulfone, diethyl sulfone, ethyl methyl sulfone, and mixtures thereof.

In a preferred embodiment, the organic solvent is a mixture of ethylene carbonate, propylene carbonate, 4-fluoro-1,3-dioxolan-2-one, and sulfolane.

Ionic Liquid

The term "ionic liquid" as used herein refers to a compound comprising a positively charged cation and a negatively charged anion, which is in the liquid state at temperature of 100° C. or less under atmospheric pressure. While ordinary liquids such as water are predominantly made of electrically neutral molecules, ionic liquids are largely made of ions and short-lived ion pairs. As used herein, the term "ionic liquid" indicates a compound free from solvent.

The term "cationic atom" as used herein refers to at least one non-metal atom which carries the positive charge.

The term "onium cation" as used herein refers to a positively charged ion having at least part of its charge localized on at least one non-metal atom such as O, N, S, or P.

In the present invention, the ionic liquid has a general formula of $A^{n-}Q^{1+}_{(n/1)}$, wherein
  $A^{n-}$ represents an anion;
  $Q^{1+}_{(n/1)}$ represents a cation;
  n and l, independently selected between 1 and 5, represent respectively the charges of the anion $A^{n-}$ and of the cation $Q^{1+}_{(n/1)}$.

The cation(s) may be selected, independently of one another, from metal cations and organic cations. The cation (s) may be mono-charged cations or polycharged cations.

As metal cation, mention may preferably be made of alkali metal cations, alkaline-earth metal cations and cations of d-block elements.

In the present invention, $Q^{1+}_{(n/1)}$ may represent an onium cation. Onium cations are cations formed by the elements of Groups VB and VIB (as defined by the old European IUPAC system according to the Periodic Table of the Elements) with three or four hydrocarbon chains. The Group VB comprises the N, P, As, Sb and Bi atoms. The Group VIB comprises the O, S, Se, Te and Po atoms. The onium cation can in particular be a cation formed by an atom selected from the group consisting of N, P, O and S, more preferably N and P, with three or four hydrocarbon chains.

The onium cation $Q^{1+}_{(n/1)}$ can be selected from:

heterocyclic onium cations; in particular those selected from the group consisting of:

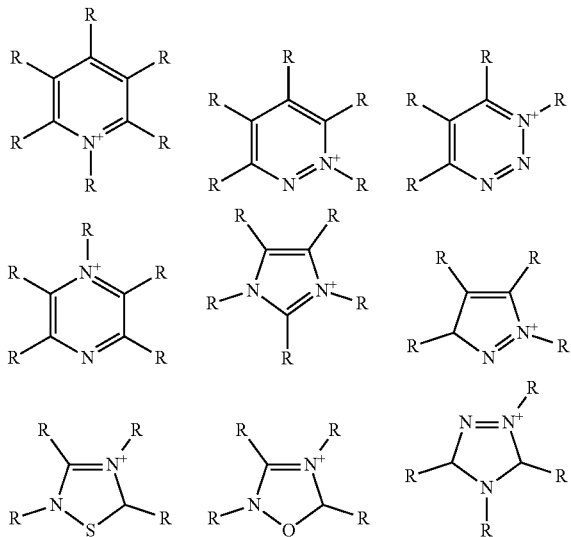

unsaturated cyclic onium cations; in particular those selected from the group consisting of:

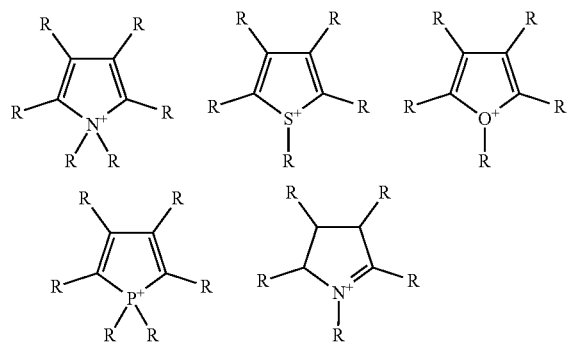

saturated cyclic onium cations; in particular those selected from the group consisting of:

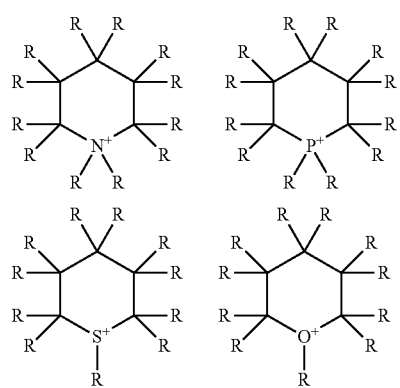

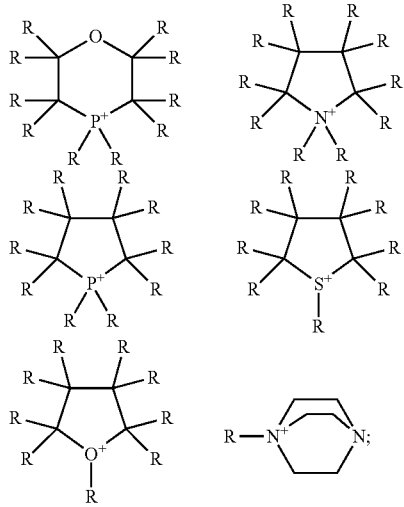

and non-cyclic onium cations; in particular those of general formula $^+L\text{-}R'_s$, in which L represents an atom selected from the group consisting of N, P, O and S, more preferably N and P, s represents the number of R' groups selected from 2, 3 or 4 according to the valence of the element L, each R' independently represents a hydrogen atom or a $C_1$ to $C_8$ alkyl group, and the bond between $L^+$ and R' can be a single bond or a double bond.

In the above formulas, each "R" symbol represents, independently of one another, a hydrogen atom or an organic group. Preferably, each "R" symbol can represent, in the above formulas, independently of one another, a hydrogen atom or a saturated or unsaturated and linear, branched or cyclic $C_1$ to $C_{18}$ hydrocarbon group optionally substituted one or more times by a halogen atom, an amino group, an imino group, an amide group, an ether group, an ester group, a hydroxyl group, a carboxyl group, a carbamoyl group, a cyano group, a sulfone group or a sulfite group.

The cation $Q^{1+}_{(n/1)}$ can more particularly be selected from ammonium, phosphonium, pyridinium, pyrrolidinium, pyrazolinium, imidazolium, arsenium, quaternary phosphonium and quaternary ammonium cations.

The quaternary phosphonium or quaternary ammonium cations can more preferably be selected from tetraalkylammonium or tetraalkylphosphonium cations, trialkylbenzylammonium or trialkylbenzylphosphonium cations or tetraarylammonium or tetraarylphosphonium cations, the alkyl groups of which, either identical or different, represents a linear or branched alkyl chain having from 4 to 12 carbon atoms, preferably from 4 to 6 carbon atoms, and the aryl groups of which, either identical or different, represents a phenyl or naphthyl group.

In a specific embodiment, $Q^{1+}_{(n/1)}$ represents a quaternary phosphonium or quaternary ammonium cation.

In one preferred embodiment, $Q^{1+}_{(n/1)}$ represents a quaternary phosphonium cation. Non-limiting examples of the quaternary phosphonium cation comprise trihexyl(tetradecyl)phosphonium, and a tetraalkylphosphonium cation, particularly the tetrabutylphosphonium ($PBu_4$) cation.

In another embodiment, $Q^{1+}_{(n/1)}$ represents an imidazolium cation. Non-limiting examples of the imidazolium cation comprise 1,3-dimethylimidazolium, 1-(4sulfobutyl)-3-methyl imidazolium, 1-allyl-3H-imidazolium, 1-butyl-3- methylimidazolium, 1-ethyl-3-methylimidazolium, 1-hexyl-3-methylimidazolium, 1-octyl-3-methylimidazolium In another embodiment, $Q^{1+}_{(n/1)}$ represents a quaternary ammonium cation which is selected in particular from the group consisting of tetraethylammonium, tetrapropylammonium, tetrabutylammonium, trimethylbenzylammonium, methyltributylammonium, N,N-diethyl-N-methyl-N-(2-methoxyethyl) ammonium, N,N-dimethyl-N-ethyl-N-(3-methoxypropyl) ammonium, N,N-dimethyl-N-ethyl-N-benzyl ammonium, N,N-dimethyl-N-ethyl-N-phenylethyl ammonium, N-tributyl-N-methyl ammonium, N-trimethyl-N-butyl ammonium, N-trimethyl-N-hexyl ammonium, N-trimethyl-N-propyl ammonium, and Aliquat 336 (mixture of methyltri($C_8$ to $C_{10}$ alkyl)ammonium compounds).

In one embodiment, $Q^{1+}_{(n/1)}$ represents a piperidinium cation, in particular N-butyl-N-methyl piperidinium, N-propyl-N-methyl piperidinium.

In another embodiment, $Q^{1+}_{(n/1)}$ represents a pyridinium cation, in particular N-methylpyridinium.

In a more preferred embodiment, $Q^{1+}_{(n/1)}$ represents a pyrrolidinium cation. Among specific pyrrolidinium cations, mention may be made of the following: $C_{1-12}$alkyl-$C_{1-12}$alkyl-pyrrolidinium, and more preferably $C_{1-4}$alkyl-$C_{1-4}$alkyl-pyrrolidinium. Examples of pyrrolidinium cations comprise, but not limited to, N,N-dimethylpyrrolidinium, N-ethyl-N-methylpyrrolidinium, N-isopropyl-N-methylpyrrolidinium, N-methyl-N-propylpyrrolidinium, N-butyl-N-methylpyrrolidinium, N-octyl-N-methylpyrrolidinium, N-benzyl-N-methylpyrrolidinium, N-cyclohexylmethyl-N-methylpyrrolidinium, N-[(2-hydroxy)ethyl]-N-methylpyrrolidinium. More preferred are N-methyl-N-propylpyrrolidinium (PYR13) and N-butyl-N-methylpyrrolidinium (PYR14).

Non-limiting examples of an anion of the ionic liquid comprise iodide, bromide, chloride, hydrogen sulfate, dicyanamide, acetate, diethyl phosphate, methyl phosphonate, fluorinated anion, e.g., hexafluorophosphate ($PF_6^-$) and tetrafluoroborate ($BF_4^-$), and oxaloborate of the following formula:

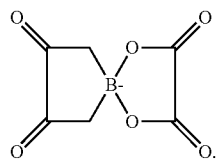 [SMILES: O=C1C[B-]2(CC1=O)OC(=O)C(=O)O2]

In one embodiment, $A^{n-}$ is a fluorinated anion. Among the fluorinated anions that can be used in the present invention, fluorinated sulfonimide anions may be particularly advantageous. The organic anion may in particular be selected from the anions having the following general formula:

$(E_a\text{-}SO_2)N^-R$ in which:
$E_a$ represents a fluorine atom or a group having preferably from 1 to 10 carbon atoms, selected from fluoroalkyls, perfluoroalkyls and fluoroalkenyls, and
R represents a substituent.

Preferably, $E_a$ may represent F or $CF_3$.

According to a first embodiment, R represents a hydrogen atom.

According to a second embodiment, R represents a linear or branched, cyclic or non-cyclic hydrocarbon-based group, preferably having from 1 to 10 carbon atoms, which can optionally bear one or more unsaturations, and which is optionally substituted one or more times with a halogen atom, a nitrile function, or an alkyl group optionally substituted one of several time by a halogen atom. Moreover, R may represent a nitrile group —CN.

According to a third embodiment, R represents a sulfinate group. In particular, R may represent the group —$SO_2$-$E_a$, $E_a$ being as defined above. In this case, the fluorinated anion may be symmetrical, i.e. such that the two $E_a$ groups of the anion are identical, or non-symmetrical, i.e. such that the two $E_a$ groups of the anion are different.

Moreover, R may represent the group —$SO_2$—R', R' representing a linear or branched, cyclic or non-cyclic hydrocarbon-based group, preferably having from 1 to 10 carbon atoms, which can optionally bear one or more unsaturations, and which is optionally substituted one or more times with a halogen atom, a nitrile function, or an alkyl group optionally substituted one of several time by a halogen atom. In particular, R' may comprise a vinyl or allyl group. Furthermore, R may represent the group —$SO_2$—N—R', R' being as defined above or else R' represents a sulfonate function —$SO_3$.

Cyclic hydrocarbon-based group may preferably refer to a cycloalkyl group or to an aryl group. "Cycloalkyl" refers to a monocyclic hydrocarbon chain, having 3 to 8 carbon atoms. Preferred examples of cycloalkyl groups are cyclopentyl and cyclohexyl. "Aryl" refers to a monocyclic or polycyclic aromatic hydrocarbon group, having 6 to 20 carbon atoms. Preferred examples of aryl groups are phenyl and naphthyl. When the group is a polycyclic group, the rings may be condensed or attached by σ (sigma) bonds.

According to a fourth embodiment, R represents a carbonyl group. R may in particular be represented by the formula —CO—R', R' being as defined above.

The organic anion that can be used in the present invention may advantageously be selected from the group consisting of $CF_3SO_2N^-SO_2CF_3$ (bis(trifluoromethane sulfonyl)imide anion, commonly denoted as TFSI), $FSO_2N^-SO_2F$ (bis(fluorosulfonyl)imide anion, commonly denoted as FSI), $CF_3SO_2N^-SO_2F$, and $CF_3SO_2N^-SO_2N^-SO_2CF_3$.

In a preferred embodiment, the ionic liquid contains:
a positively charged cation selected from the group consisting of imidazolnium, pyridinium, pyrrolidinium and piperidinium ions optionally containing one or more $C_1$-$C_{30}$ alkyl groups, and
a negatively charged anion selected from the group consisting of halides, fluorinated anions and borates.

Non-limiting examples of $C_1$-$C_{30}$ alkyl groups include, notably, methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

In the present invention, X within the (iii) at least one metal compound of formula (I) as above defined, equal to or different from each other and at each occurrence, is a linear or branched $C_1$-$C_{12}$ hydrocarbon group comprising at least one —N═C═O functional group and Y, equal to or different from each other and at each occurrence, is OR, wherein R is a linear or branched $C_1$-$C_5$ alkyl group, preferably being a methyl or ethyl group.

Non-limiting examples of the (iii) at least one metal compound of formula (I) as above defined include trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate and triethoxysilyl hexyl isocyanate.

In a preferred embodiment, the (iii) at least one metal compound of formula (I) as above defined is triethoxysilyl propyl isocyanate.

The selection of the hydrolysable group Y' of the (iv) at least one metal compound of formula (II) as defined above is not particularly limited provided that it enables under appropriate conditions the formation of the fluoropolymer hybrid organic/inorganic composite of the present invention. The hydrolysable group Y' is typically selected from the group consisting of halogen atoms, preferably being a chlorine atom, hydrocarboxy groups, acyloxy groups and hydroxyl groups.

In case the (iv) at least one metal compound of formula (II) as defined above comprises at least one functional group different from the —N=C=O functional group on group X', it will be designated as functional compound. In case none of groups X' comprises a functional group different from the —N=C=O functional group, it will be designated as non-functional compound.

Mixtures of one or more functional compounds and one or more non-functional compounds may be used as the (iv) at least one metal compound of formula (II) as above defined in the process of the invention.

Functional compounds can advantageously further modify the chemistry and the properties of the grafted fluoropolymer over the native fluoropolymer and native inorganic phase.

Non limitative examples of functional groups different from the —N=C=O functional group include, notably, epoxy group, carboxylic acid group (in its acid, ester, amide, anhydride, salt or halide form), sulphonic grup (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

Examples of functional compounds are notably vinyltriethoxysilane, vinyltrimethoxysilane, vinyltrismethoxyethoxysilane of formula CH$_2$=CHSi(OC$_2$H$_4$OCH$_3$)$_3$, 2-(3, 4-epoxycyclohexylethyltrimethoxysilane) of the following formula:

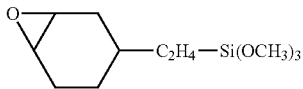

glycidoxypropylmethyldiethoxysilane of the following formula:

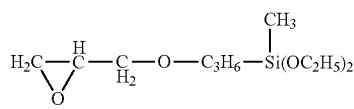

glycidoxypropyltrimethoxysilane of the following formula:

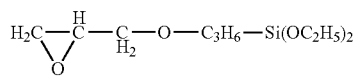

methacryloxypropyltrimethoxysilane of the following formula:

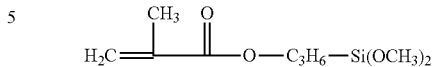

aminoethylaminopropylmethyldimethoxysilane of the following formula:

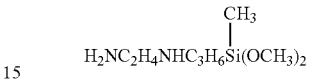

aminoethylaminopropyltrimethoxysilane of the following formula:

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3- acryloxypropyl)dimethylmethoxysilane, (3-acryloxypropyl)methyldichlorosilane, (3- acryloxypropyl)methyldimethoxysilane, 3-(n-allylamino) propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of the following formula:

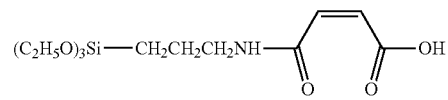

3-(trihydroxysilyl)-1-propane-sulphonic acid of formula HOSO$_2$—CH$_2$CH$_2$CH$_2$—Si(OH)$_3$, N-(trimethoxysilylpropyl)ethylene-diamine triacetic acid, and its sodium salts, 3-(triethoxysilyl)propylsuccinic anhydride of the following formula:

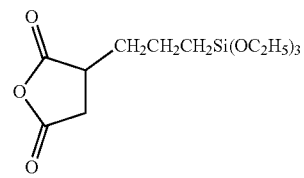

acetamidopropyltrimethoxysilane of formula H$_3$C—C(O)NH—CH$_2$CH$_2$CH$_2$—Si(OCH$_3$)$_3$, alkanolamine titanates of formula Ti(L)$_x$(OR)$_y$, wherein L is an amine-substituted alkoxy group, e.g. OCH$_2$CH$_2$NH$_2$, R is an alkyl group, and x and y are integers such that x+y=4.

Examples of non-functional compounds are notably trimethoxysilane, triethoxysilane, tetramethoxysilane (TMOS), tetraethoxysilane (TEOS), tetramethyltitanate, tetraethyltitanate, tetra-n-propyltitanate, tetraisopropyltitanate, tetra-n-butyltitanate, tetra-isobutyltitanate, tetra-tert-butyltitanate, tetra-n-pentyltitanate, tetra-n-hexyltitanate, tetraisooctyltitanate, tetra-n-lauryltitanate, tetraethylzirconate, tetra-n-propylzirconate, tetraisopropylzirconate, tetra-n- butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

In a preferred embodiment, the (iv) at least one metal compound of formula (II) is tetraethoxysilane (TEOS).

At least one acid catalyst may be added to the step c) of the process according to the present invention.

The choice of the acid catalyst is not particularly limited. The acid catalyst is typically selected from the group consisting of organic acids and inorganic acids, preferably organic acids. Formic acid is among the preferred acids which can be used in the process according to the present invention.

A second object of the present invention is a polymer electrolyte membrane obtainable by the process according to the present invention.

A third object of the present invention is an electrochemical device comprising the polymer electrolyte membrane obtainable by the process according to the present invention between a positive electrode and a negative electrode.

In one embodiment, at least one of the positive electrode and the negative electrode comprises metal salt, preferably a transition metal salt, an alkaline metal salt or an alkaline-earth metal salt, more preferably Li salt, Na salt, K salt or Cs salt, and even more preferably Li salt.

Still another object of the invention is the use of the polymer electrolyte membrane obtainable by the process according to the present invention in an electrochemical device, in particular in secondary batteries.

Should the disclosure of any patents, patent applications, and publications which are incorporated herein by reference conflict with the description of the present application to the extent that it may render a term unclear, the present description shall take precedence.

The invention will be now explained in more details with reference to the following examples, whose purpose is merely illustrative and not intended to limit the scope of the invention.

EXAMPLES

Raw Materials

Fluoropolymer: Solef® VDF/HEA/HFP copolymer, available from Solvay Specialty Polymers Italy S.p.A.
  TSPi: 3-(triethoxysilyl)propyl isocyanate
  Tetraethoxysilane (TEOS): commercially available as liquid from Aldrich Chemistry (purity >99%)
  Organic solvents:
  ethylene carbonate (EC)
  propylene carbonate (PC)
  fluoroethylene carbonate (FEC)
  sulfolane (SL)

Example 1 (Ex 1)

The fluoropolymer was pre-dried overnight at 80° C. under vacuum. The fluoropolymer (5.0 g, 10.0 parts by weight with respect to the total weight of the organic solvent(s) used) was dissolved in a mixture of EC/PC (1:1 w/w; 45.0 g). After the fluoropolymer being completely dissolved, 106 mg (1.1 mol % with respect to the total moles of fluoropolymer) of TSPi was added into the solution and then stirred for mixing for 60 min at 80° C. TEOS (1.6 g) was added thereto with stirring for 5 min and then 360 mg (1 equivalent vs TEOS) of formic acid was added also with stirring for 5 min, while maintaining the temperature at 80° C. The quantity of TEOS was calculated from the weight ratio ($m_{SiO_2}/m_{fluoropolymer}$) of 10%, assuming total conversion of TEOS into $SiO_2$.

After the addition of formic acid, the resulting solution was spread in a constant thickness onto a HALAR®9414 film substrate using a tape casting machine (Doctor Blade). Thusly-produced membrane was left at 50° C. for 30 minutes to allow the sol-gel reaction to proceed.

N,N-dimethylformamide (DMF) is a good solvent for the fluoropolymer, but the fluoropolymer electrolyte membrane comprising hybrid organic/inorganic composite as above prepared is insoluble in such solvent. The more crosslinking density of the membrane, the less dissolution of the membrane in DMF. Accordingly, by using this feature, whether the hybrid organic/inorganic composite was created can be checked with the dissolution test in DMF. With this purpose, the membrane was placed in about 5 mL of DMF for about 1 minute at room temperature.

Example 2-5 (Ex 2-5)

Ex 2-5 were prepared in the same way as Ex 1, with the only difference in the amount of the organic solvent(s) used and the amount of the F-polymer only for Ex 2. For instance, in Ex 5, a mixture of EC/PC/FEC/SL (20:10:10:60 w/w) was used instead.

Comparative Example (Comp. Ex 1)

The fluoropolymer was pre-dried overnight at 80° C. under vacuum. The fluoropolymer (5.0 g, 10.0 parts by weight with respect to the total weight of the organic solvent(s) used) was dissolved in acetone (45.0 g). After the fluoropolymer being completely dissolved, the solution was homogeneous and transparent after homogenization at room temperature. 106 mg (1.1 mol % with respect to the total moles of fluoropolymer) of TSPi was added into the solution and then stirred for mixing for 90 min at 60° C. Then, 1 M of $LiPF_6$ dissolved in a mixture of EC/MC (50:50) was added into the solution. Subsequently, TEOS (1.6 g) was added thereto with stirring for 5 min and then 360 mg (1 equivalent vs TEOS) of formic acid was added also with stirring for 5 min, while maintaining the temperature at 60° C. so as to produce a polymer electrolyte membrane of Comp. Ex 1. Addition drying step was implemented so as to evaporate acetone.

Thusly-produced membrane however still contained residual acetone varying its amount from 600 ppm to 0.65 w % with respect to the total weight of the membrane. Such residual acetone would be detrimental to the performance of the battery cycle in the end.

The detailed compositions were mentioned in the below Table 1.

TABLE 1

|  | Ex 1 | Ex 2 | Ex 3 | Ex 4 | Ex 5 | Comp. Ex 1 |
|---|---|---|---|---|---|---|
| F-polymer (pbw) | 10.0 | 13.0 | 10.0 | 10.0 | 10.0 | 10.0 |
| EC (wt %) | 50.0 | 50.0 | — | 45.0 | 20.0 | — |
| PC (wt %) | 50.0 | 50.0 | 100.0 | 45.0 | 10.0 | — |
| FEC (wt %) | — | — | — | 10.0 | 10.0 | — |
| Sulfolane (wt %) | — | — | — | — | 60.0 | — |
| Processing solvent (wt %) | — | — | — | — | — | 90.0 (acetone) |

TABLE 1-continued

|  | Ex 1 | Ex 2 | Ex 3 | Ex 4 | Ex 5 | Comp. Ex 1 |
|---|---|---|---|---|---|---|
| Li salt | — | — | — | — | — | LiPF$_6$ [1M in EC/PC (50:50)] |
| Solubility | OK | OK | OK | OK | OK | OK |
| Grafting | OK | OK | OK | OK | OK | OK |
| Residual solvent in the membrane | — | — | — | — | — | 600 ppm to 0.65 wt %* |

*Residual amount of acetone was measured several times by using Gas Chromatograph (Agilent system) with DB-WAX Ultra Inert Column [30 m (length)*0.32 mm (inner diameter)*0.5 μm (film)] under the temperature conditions starting from 40° C. up to 160° C. (in 8 min) or 240° C. (in 15 min) with 2 min of rest time.
All experiments were carried out under protected environment (flushing with N$_2$).

The invention claimed is:

1. A process for manufacturing a fluoropolymer electrolyte membrane comprising a fluoropolymer hybrid organic/inorganic composite for an electrochemical device, said process comprising the steps of:
   a) dissolving i) at least one fluoropolymer in ii) at least one liquid medium, wherein the i) at least one fluoropolymer comprises
      at least one first recurring unit derived from at least one ethylenically unsaturated fluorinated monomer and
      at least one second recurring unit derived from at least one ethylenically unsaturated monomer having at least one hydroxyl group;
   b) reacting at least a fraction of the hydroxyl groups of the i) at least one fluoropolymer with iii) at least one metal compound of formula (I)

   $$X_{4-m}AY_m \qquad (I)$$

wherein m is an integer from 1 to 3, A is a metal selected from the group consisting of Si, Ti and Zr, Y is a hydrolysable group and X is a hydrocarbon group comprising at least one isocyanate (—N=C=O) functional group, thereby providing a composition comprising at least one grafted fluoropolymer comprising at least one hydrogenated monomer having at least one pendant side chain comprising an end group of formula —O—C(O)—NH—Z—AY$_m$X$_{3-m}$, wherein m, Y, A and X have the same meaning as defined above and Z is a hydrocarbon group, optionally comprising at least one —N=C=O functional group;
   c) reacting the end group of formula —O—C(O)—NH—Z—AY$_m$X$_{3-m}$ with iv) at least one metal compound of formula (II)

   $$X'_{4-m'}A'Y'_{m'} \qquad (II)$$

wherein m' is in integer from 1 to 4, A' is a metal selected from the group consisting of Si, Ti and Zr, Y' is a hydrolysable group, optionally comprising at least one functional group different from the —N=C=O group, and X' is a hydrocarbon group, thereby providing a composition comprising at least one fluoropolymer hybrid organic/inorganic composite; and
   d) processing the composition from step c) into a polymer electrolyte membrane, characterized by the absence of a drying step.

2. The process according to claim 1, wherein the fluoropolymer electrolyte membrane is free from a metal salt.

3. The process according to claim 1, wherein the step c) is implemented at temperature between 50° C. and 100° C.

4. The process according to claim 1, wherein the (ii) at least one liquid medium comprises at least one organic solvent and optionally at least one ionic liquid.

5. The process according to claim 1, wherein the at least one first recurring unit is derived from vinylidene fluoride (VDF), chlorotrifluoroethylene (CTFE), hexafluoropropylene (HFP), tetrafluoroethylene (TFE), trifluoroethylene, and combinations thereof.

6. The process according to claim 1, wherein the at least one second recurring unit is derived from an (meth)acrylic acid ester having at least one hydroxyl group.

7. The process according to claim 6, wherein the (meth)acrylic acid ester having a hydroxyl group comprises 2-hydroxyethyl acrylate (HEA), 2-hydroxyethyl methacrylate, 2-hydroxymethyl acrylate, 2-hydroxymethyl methacrylate, 2-hydroxypropyl acrylate, 2-hydroxypropyl methacrylate, 2-hydroxybutyl acrylate, 2-hydroxybutyl methacrylate, 4-hydroxybutyl acrylate, 4-hydroxybutyl methacrylate, 6-hydroxyhexyl acrylate, 6-hydroxyhexyl methacrylate, 8-hydroxyoctyl acrylate, 8-hydroxyoctyl methacrylate, 2-hydroxyethyleneglycol acrylate, 2-hydroxyethlyeneglycol methacrylate, 2-hydroxypropyleneglycol acrylate, 2-hydroxypropyleneglycol methacrylate, 2,2,2-trifluoroethyl acrylate, 2,2,2-trifluoroethyl methacrylate or mixtures thereof.

8. The process according to claim 1, wherein X within the iii) at least one metal compound of formula (I), equal to or different from each other and at each occurrence, is a linear or branched C$_1$-C$_{12}$ hydrocarbon group comprising at least one —N=C=O functional group and Y, equal to or different from each other and at each occurrence, is OR, wherein R is a linear or branched C$_1$-C$_5$ alkyl group.

9. The process according to claim 8, wherein the iii) at least one metal compound of formula (I) is selected from the group consisting of trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate, triethoxysilyl hexyl isocyanate, and mixtures thereof.

10. The process according to claim 1, wherein the iv) at least one metal compound of formula (II) comprises trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate, or mixtures thereof.

11. A polymer electrolyte membrane obtainable by the process according to claim 1.

12. An electrochemical device comprising the polymer electrolyte membrane, obtainable by the process according to claim 1, between a positive electrode and a negative electrode.

13. The electrochemical device according to claim 12, wherein at least one of the positive electrode and the negative electrode comprises metal salt.

14. A method of using a polymer electrolyte membrane obtainable by the process according to claim 1, the method comprising using the polymer electrolyte membrane in a secondary battery.

* * * * *